June 26, 1951 T. A. SMOKE 2,558,009
ELECTRIC AUTOMATIC SOLDERING IRON
Filed Sept. 4, 1945

INVENTOR.
Thomas A. Smoke
BY
Ralph L. Chappell
ATTORNEY

Patented June 26, 1951

2,558,009

UNITED STATES PATENT OFFICE 2,558,009

ELECTRIC AUTOMATIC SOLDERING IRON

Thomas Albert Smoke, Whitesville-Lakewood, N. J.

Application September 4, 1945, Serial No. 614,328

1 Claim. (Cl. 113—109)

(Granted under the act of March 3, 1883, as amended April 30, 1928; 370 O. G. 757)

This invention relates to improvements in electrical soldering irons having an automatic feeding mechanism. In the construction of a preferred embodiment of the invention, a pistol with a trigger arrangement for feeding the solder is provided. This enables a man to handle the iron and solder with one hand, leaving the other hand free to place and hold the work, and thereby allows for greater output and contributes to the production of neater work.

An object of the invention is to provide a soldering iron with an automatic solder-feeding mechanism.

Another object is to provide a soldering iron with a pistol-like handle combined with an automatic feeding mechanism so that the iron can be operated with one hand.

Figure 1:
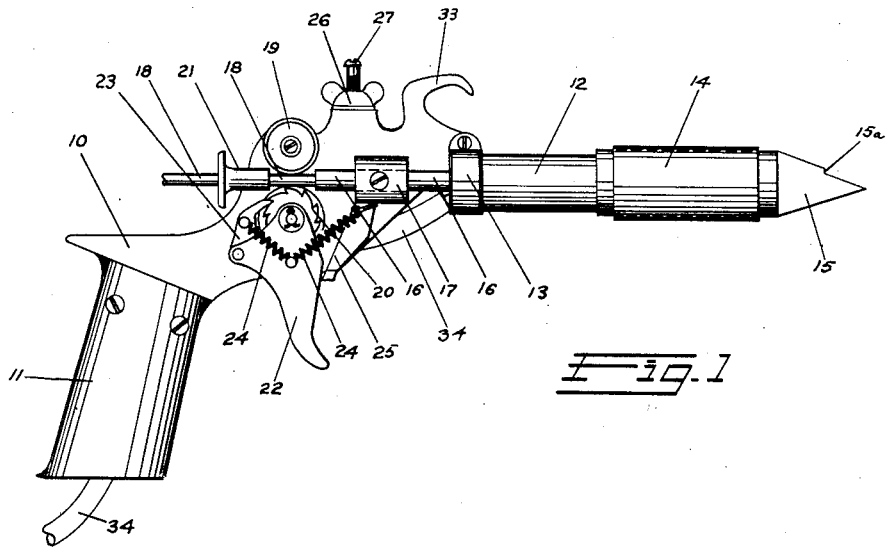
Figure 2:
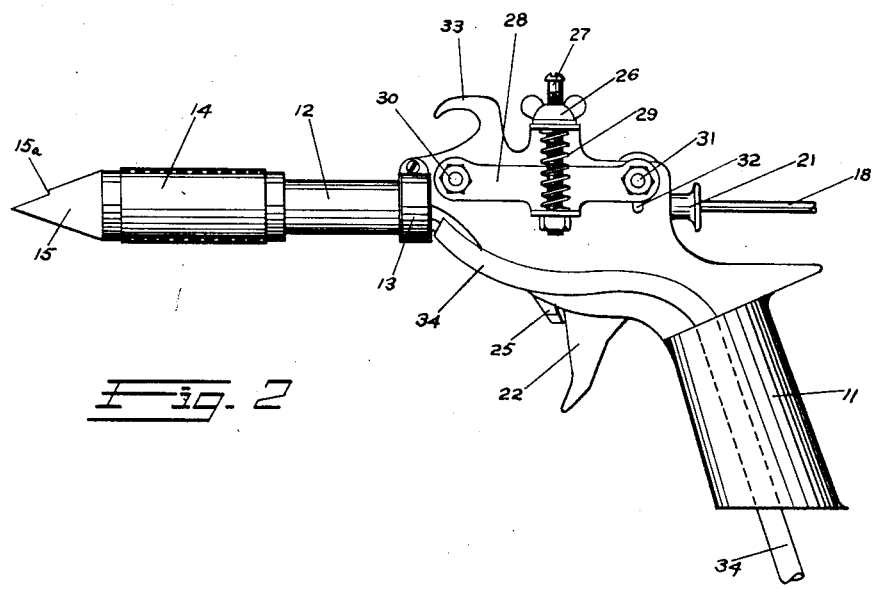

Further objects and advantages of this invention, as well as its construction, arrangement and operation, will be apparent from the following description and claims in connection with the accompanying drawings, in which Fig. 1 is a righthand side elevation of one embodiment of the invention; and Fig. 2 is a lefthand side elevation thereof.

A frame 10 is attached to a pistol-like handle 11. A hollow barrel 12 is attached to frame 10 by means of barrel support clamp 13. The electrical heating unit 14 is a portion of barrel 12 and has threaded to it a soldering tip 15. Tips of different sizes and shapes are made to fit the heating unit 14 and are interchangeable. Each tip has a holder outlet-hole 15a.

Running the full length of the barrel and extending therefrom at the end of the barrel distal the soldering tip 15 is a tube 16 supported by tube frame 17. Wire solder 18 is fed through tube 16 by means of compression-feed roller 19 and ratchet-feed roller 20. The wire solder 18 is directed between these two rollers by means of a funnel shaped guideway 21 which is attached to frame 10 by suitable means, such as welding.

Ratchet-feed roller 20 is operated by feed trigger 22 in conjunction with ratchet dog 23 and trigger-control springs 24. In addition, a trigger stop 25 is provided.

The compression exerted by compression feed roller 19 is adjustable by means of feed-compression wing-nut 26. Wing-nut 26 is threaded on adjusting screw 27 which in turn is bolted to compression arm 28. Compression spring 29 which operates upon arm 28 is held in position by adjusting screw 27. Compression arm 28 is supported by frame 10 on arm bolt 30 and is pivotable about said arm. Compression feed roller 19 is attached to compression arm 28 by means of bolt and nut 31. By backing off on wing nut 26, compression arm 28 is forced downward by compression spring 29, there being a slot 32 in frame 10 to allow for said reciprocal action.

In addition, a portion of frame 10 is formed to provide a hang-up hook 33 and an electric cord 34 passes through handle 11 and goes on up into barrel 12 to supply the heating unit with electric power.

In operation, wire solder is passed through guideway 21, between the two feed rollers 19—20, on into and through solder tube 17, barrel 12, and heating unit 14. When heat is applied, melted solder runs out of outlet hole 15a. Additional solder is fed merely by operating the feed trigger.

Various modifications and changes can be made in the subject device without departing from the scope of the invention.

The invention described herein may be manufactured and used by or for the Government of the United States of America for governmental purposes without the payment of any royalties thereon or therefor.

I claim:

In a soldering iron, a frame having a slot, a first roller carried rotatably on said frame, means to rotate said roller, and a compression-feed roller assembly, said assembly comprising an adjusting screw carried slidably in said frame, a compression arm secured rotatably at one end thereof to said frame and secured to said screw, a compression spring carried on said screw and bearing against said arm and said frame, a pin carried on the other end of said arm, said pin being slidable in said slot, a compression-feed roller mounted rotatably on said pin, said compression-feed roller being limited by said slot to movement into non-contiguous proximity to said first roller and being adapted to bear against wire solder carried upon said first roller, and a wing nut threaded on said screw exterior said frame.

THOMAS ALBERT SMOKE.

REFERENCES CITED

The following references are of record in the file of this patent:

UNITED STATES PATENTS

| Number | Name | Date |
| --- | --- | --- |
| 1,215,693 | Orme | Feb. 13, 1917 |
| 1,293,540 | Pine | Feb. 4, 1919 |
| 1,357,752 | Weber | Nov. 2, 1920 |
| 1,893,093 | Linville | Jan. 3, 1933 |
| 1,966,200 | Eskilson | July 10, 1934 |
| 2,251,557 | Weston | Aug. 5, 1941 |

FOREIGN PATENTS

| Number | Country | Date |
| --- | --- | --- |
| 481,669 | Great Britain | Mar. 15, 1938 |